`3,529,001`
PROCESS FOR DECOLORIZING N,N-DISUBSTITUTED AMIDES

Robert R. Mod, Frank C. Magne, and Evald L. Skau, New Orleans, La., assignors to the United States of America as represented by the Secretary of Agriculture
No Drawing. Filed July 10, 1968, Ser. No. 743,612
Int. Cl. C09f 7/02
U.S. Cl. 260—404      2 Claims

ABSTRACT OF THE DISCLOSURE

Certain N,N-disubstituted amide plasticizers are rendered substantially color-free by aeration followed by an activated alumina treatment.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for decolorizing certain plasticizers. Specifically, this invention relates to a process for the removal of color from N,N-disubstituted amide plasticizers. The invention finds utility in the preparation of plasticizers for vinyl chloride polymer and copolymer resins.

The primary object of this invention is to remove color from N,N-disubstituted amides of fatty acids.

The object is accomplished by aeration of the colored amide and subsequent removal of the colored constituents by selective adsorption thereof on a suitable selective adsorbent. The process of the instant invention comprises aeration as a first step. The aeration apparently has the effect of transforming the colored constituents to oxidized forms and these are readily removed by the adsorptive percolation step of the process.

The removal of color has been and continues to be an important requirement in the commercial production of high quality plasticizers for vinyl chloride polymer and copolymer resins; i.e., PVC. The thermal stability of PVC resins plasticized with amide plasticizers such as N,N-dialkyloleamides and the morpholide and piperidide of oleic acid is markedly improved by removal of color from the plasticizer. That is, color in the plasticizer results in a greater sensitivity of the plasticized resin to heat, as indicated by a greater tendency to become discolored by heat during the preparation, processing, or use of the plasticized resin.

Prior to our invention color could be partially removed by percolating the amide, or a solution of the amide in a nonpolar solvent such as commercial hexane, through a column of a selective adsorbent such as activated alumina; but repeated additional selective adsorbent treatments were relatively ineffective so that many such successive adsorbent treatments were required to obtain a product which was almost water white.

We have now discovered that aeration of a plasticizer exhibiting color results in a tremendous increase in the efficiency of ultimate color removal by the selective adsorbent treatment so that subsequent to aeration a water-white or substantially colorless product can be obtained by a single such selective adsorbent treatment. The conversion of the color constituents takes place spontaneously but very slowly when exposed to air during laboratory storage at room temperature. The rate of conversion is markedly accelerated by raising the temperature, by exposure to ultraviolet or solar radiation, or by saturation of the amide with air either by bubbling air through the amide or by mechanical dispersion of fine air bubbles throughout the amide sample.

In general, the crux of the instant invention can best be described as a process for decolorizing N,N-disubstituted amides which are derivatives of fatty acids, comprising:

(a) aerating the N,N-disubstituted amides of fatty acids at temperatures about from 50° to 110° C.,
(b) dissolving the aerated amides in a nonpolar solvent,
(c) percolating the dissolved amide through a selective adsorbent for fatty-acid-derivative oxidation or autoxidation products,
(d) washing the adsorbent with solvent, and
(e) removing the solvent from the combined percolate and washings.

Alternatively, step (b) may be omitted. That is, the aerated amide may be put on the adsorbent column neat and eluted with the solvent.

Preferred adsorbents are those which selectively adsorb fatty-acid-derivative oxidation and autoxidation products, such as activated alumina or mixtures of fuller's earth and carbon black. If the amide plasticizer contains an appreciable percentage of free fatty acid a correspondingly larger amount of adsorbent per gram of amide may be required. In any case, the required duration and optimum temperature of the aeration step as well as the amount of adsorbent per gram of amide for a given sample can readily be found by preliminary tests on small aliquots of the sample. The amount of solvent used for dilution and/or washing is not critical, affecting only the yield.

It must be noted, in furthering the state of the art, that after the amide plasticiers have been decolorized by the process of the instant invention the color tends to develop again on storage of the clear plasticizer. This tendency, however, can readily be decreased by adding a small quantity (about from 0.005% to 0.010%, based on the weight of the amide) of an antioxidant, such as hydroquinone or butylated hydroxyanisole, to the combined percolate and washings before removing the solvent.

The following examples are provided to illustrate the process of the present invention.

EXAMPLE 1

A 40-gram sample of N,N-dibutyloleamide which had been subjected to activated alumina treatment without previous aeration was allowed to stand for about 2 months in a partially filled bottle under ambient laboratory conditions. It had a yellowish color, giving a reading between 2 and 3 on the Gardner Color Scale. The sample was dissolved in Skellysolve B (a commercially available commercial hexane) and percolated through a column of activated alumina. The column was washed with additional Skellysolve B and the combined percolate and washings were freed from solvent by vacuum distillation. The product was substantially water white.

EXAMPLE 2

A composite of a number of colored samples of acid-free N,N-dibutyloleamide was stored for about 10 months in a partially filled glass bottle under ambient laboratory conditions. The sample was placed in a large test tube and aerated and stirred for 1.5 hours at 55° C. by a continuous stream of bubbles. The resulting yellow-colored amide was cooled, dissolved in Skellysolve B, and percolated through a column of activated alumina, which was then washed with a small volume of Skellysolve B. The combined percolate and washings were freed from solvent by stripping at reduced pressure. The product was substantially colorless, giving a reading of 1 on the Gardner Color Scale.

EXAMPLE 3

A 15-gram aliquot of a newly prepared sample of acid-free N,N-dibutyloleamide, hereinafter referred to as "Sample A," was dissolved in 25 ml. of Skellysolve B and passed through a column (15 mm. diameter) of 30 grams of activated alumina. Two 50 ml. portions of Skellysolve B were then passed through the column. The solvent was removed from the combined percolate and washings by stripping. The product was still colored, giving a reading between 2 and 3 on the Gardner Color Scale.

EXAMPLE 4

A 15-gram aliquot of Sample A was heated in a test tube for 3 hours at 100° C. while being aerated and stirred by a continuous stream of air bubbles. The sample was then cooled, dissolved in 25 ml. of Skellysolve B, and percolated through a column (diameter 15.5 mm.) of 30 grams of activated alumina. Two 50 ml. portions of Skellysolve B were then passed through and combined with the percolate. After stripping as before a product was obtained which was substantially water white or colorless, giving a reading of 1 on the Gardner Color Scale.

EXAMPLE 5

An 18-gram aliquot of Sample A was heated in a test tube for 2 hours at 85° C. while being aerated and stirred by a continuous stream of air bubbles. The sample was then cooled, dissolved in 25 ml. of Skellysolve B and percolated through a column (diameter 15.5 mm.) of 72 grams of activated alumina. Two 50 ml. portions of Skellysolve B were then passed through and combined with the percolate. After stripping as before a substantially water-white product was obtained that had a reading of 1 on the Gardner Color Scale.

We claim:
1. A process for removing the color constituents from N,N-dibutyloleamide containing same comprising:
   (a) aerating the amide at a temperature of about from 50° to 110° C., to transform the color constituents to oxidized forms readily removed by adsorptive percolation;
   (b) dissolving the aerated amide in a nonpolar solvent;
   (c) percolating the dissolved amide through activated alumina to remove the oxidized color constituents;
   (d) washing the activated alumina wtih solvent; and
   (e) removing the solvent from the combined percolate and washings to recove the decolorized N,N-dibutyloleamide.

2. A process for removing the color constituents from N,N-dibutyloleamide containing same comprising
   (a) aerating the amide at a temperature about from 50° to 110° C., to transform the color constituents to oxidized forms readily removed by adsorptive percolation;
   (b) percolating the aerated, neat amide through activated alumina to remove the oxidized color constituents;
   (c) washing the activated alumina with a nonpolar solvent; and
   (d) removing the solvent from the combined percolate and washings to recover the decolorized N,N-dibutyloleamide.

References Cited

UNITED STATES PATENTS

| | | | |
|---|---|---|---|
| 2,340,112 | 1/1944 | Davis et al. | 260—404 |
| 2,673,868 | 3/1954 | Hlavacek | 260—419 |
| 3,006,934 | 10/1961 | Dieckelmann et al. | 260—404 |
| 3,066,160 | 11/1962 | Hampton | 260—419 |
| 3,309,333 | 3/1967 | Mod et al. | 260—32.6 |
| 3,373,174 | 3/1968 | Hammerberg et al. | 260—404 |

LEWIS GOTTS, Primary Examiner

G. HOLLRAH, Assistant Examiner